US012699849B2

(12) United States Patent
Saini et al.

(10) Patent No.: US 12,699,849 B2
(45) Date of Patent: Aug. 4, 2026

(54) USING COMPLIANCE ANALYSIS TO MANAGE CUSTOMER INTERACTIONS

(71) Applicant: Wells Fargo Bank, N.A., San Francisco, CA (US)

(72) Inventors: Manesh Saini, New York, NY (US); Omar Zeitoun, New York, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 308 days.

(21) Appl. No.: 18/192,229

(22) Filed: Mar. 29, 2023

(65) Prior Publication Data

US 2024/0330596 A1     Oct. 3, 2024

(51) Int. Cl.
| | |
|---|---|
| *G06F 40/35* | (2020.01) |
| *G06Q 10/0635* | (2023.01) |
| *G06Q 10/0639* | (2023.01) |
| *G06Q 30/015* | (2023.01) |

(52) U.S. Cl.
CPC ......... *G06F 40/35* (2020.01); *G06Q 10/0635* (2013.01); *G06Q 10/06393* (2013.01); *G06Q 30/015* (2023.01)

(58) Field of Classification Search
None
See application file for complete search history.

(56) References Cited

U.S. PATENT DOCUMENTS

| | | |
|---|---|---|
| 7,006,992 B1 | 2/2006 | Packwood |
| 7,930,228 B1 | 4/2011 | Hawkins et al. |

| | | | |
|---|---|---|---|
| 8,700,415 B2 | 4/2014 | Venzon et al. | |
| 10,311,467 B2 * | 6/2019 | Ghavamzadeh ... | G06Q 30/0269 |
| 10,484,540 B2 * | 11/2019 | Fang ...................... | H04L 51/02 |
| 10,510,034 B2 | 12/2019 | Larson et al. | |
| 2008/0015913 A1 | 1/2008 | Courtney et al. | |
| 2009/0319420 A1 | 12/2009 | Sanchez et al. | |

(Continued)

FOREIGN PATENT DOCUMENTS

| | | |
|---|---|---|
| EP | 1393229 | 3/2004 |
| WO | 2008010903 | 1/2008 |
| WO | 2009155051 | 12/2009 |

OTHER PUBLICATIONS

Bhasin, Madan Lal, "British Journal of Research Combatting Bank Frauds by Intergration of Technology: Experience of a Developing Country", [Online]. Retrieved from the Internet: URL: British Journal of Research Combatting Bank Frauds by Intergration of Technology: Experience of a Developing Country , (Jun. 2016), 30 pgs.

*Primary Examiner* — Quynh H Nguyen
(74) *Attorney, Agent, or Firm* — SCHWEGMAN LUNDBERG & WOESSNER, P.A.

(57) ABSTRACT

Systems and methods may generally be used for managing customer interactions with employees of an institution. An example method may include detecting natural language used during at least one interaction of a customer with the institution. The example method may include determining whether the interaction complies with a compliance standard corresponding to customer interactions with the institution based on analysis of the natural language. The example method can further include generating a recommendation for interacting with the customer or other customers during an interaction with the institution.

20 Claims, 4 Drawing Sheets

(56)　　　　　　References Cited

U.S. PATENT DOCUMENTS

| | | | |
|---|---|---|---|
| 2010/0076791 A1* | 3/2010 | Peterson | G06Q 40/06 |
| | | | 705/4 |
| 2012/0084227 A1 | 4/2012 | Jorisch et al. | |
| 2013/0103454 A1 | 4/2013 | Agle et al. | |
| 2013/0346285 A1 | 12/2013 | Louis | |
| 2019/0287182 A1 | 9/2019 | Chetal et al. | |
| 2021/0357843 A1 | 11/2021 | Yarlagadda et al. | |
| 2024/0303431 A1* | 9/2024 | Annadi | G06F 40/40 |
| 2024/0338740 A1* | 10/2024 | Aswani | G06F 16/951 |

* cited by examiner

USING COMPLIANCE ANALYSIS TO MANAGE CUSTOMER INTERACTIONS

BACKGROUND

To remain competitive in the modern commercial environment, businesses should remain aware of evolving customer demands. Some customers or groups of customers may have predictable needs based on membership in various demographic groups or on other statuses, such as veteran status, employment status, etc. Compliance regulations may be in place for interacting with some customers, and failure to comply with regulations can result in reduced customer satisfaction, thus reducing the competitiveness of that business in the marketplace.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and techniques described herein may be used to evaluate retail stores, or branches of retail stores by providing metrics of the extent to which the stores or branches comply various regulations or other standards. With particular relation to banking retail branches, banks may fail to comply (or certain employees or branches of that bank may fail to comply) with rules that regulate financial interactions with certain customers or groups of customers. These failures can cause problems for a retail location, including poor customer perception, loss of customers, and governmental fines or other punishment.

These and other concerns are addressed using systems and techniques of various embodiments that provide scores and metrics of compliance for retail or bank branches relative to other branches or relative to competitors (where such information is available). Scores may be generated for an individual banker, a branch, a region, or the like. In the example of banking branches, a banker compliance score may be used to determine whether banker non-compliance is causing any risks to the bank or other institution. In addition, if all or most bankers in a branch or region have a particularly high or low compliance score, that can indicate higher-level policy causes leading to low or high compliance. Such an indication may be used to provide training recommendations or to provide advice regarding mitigation strategies (e.g., for mitigating an adverse event or preventing and adverse customer event) and actions.

Figure 1:
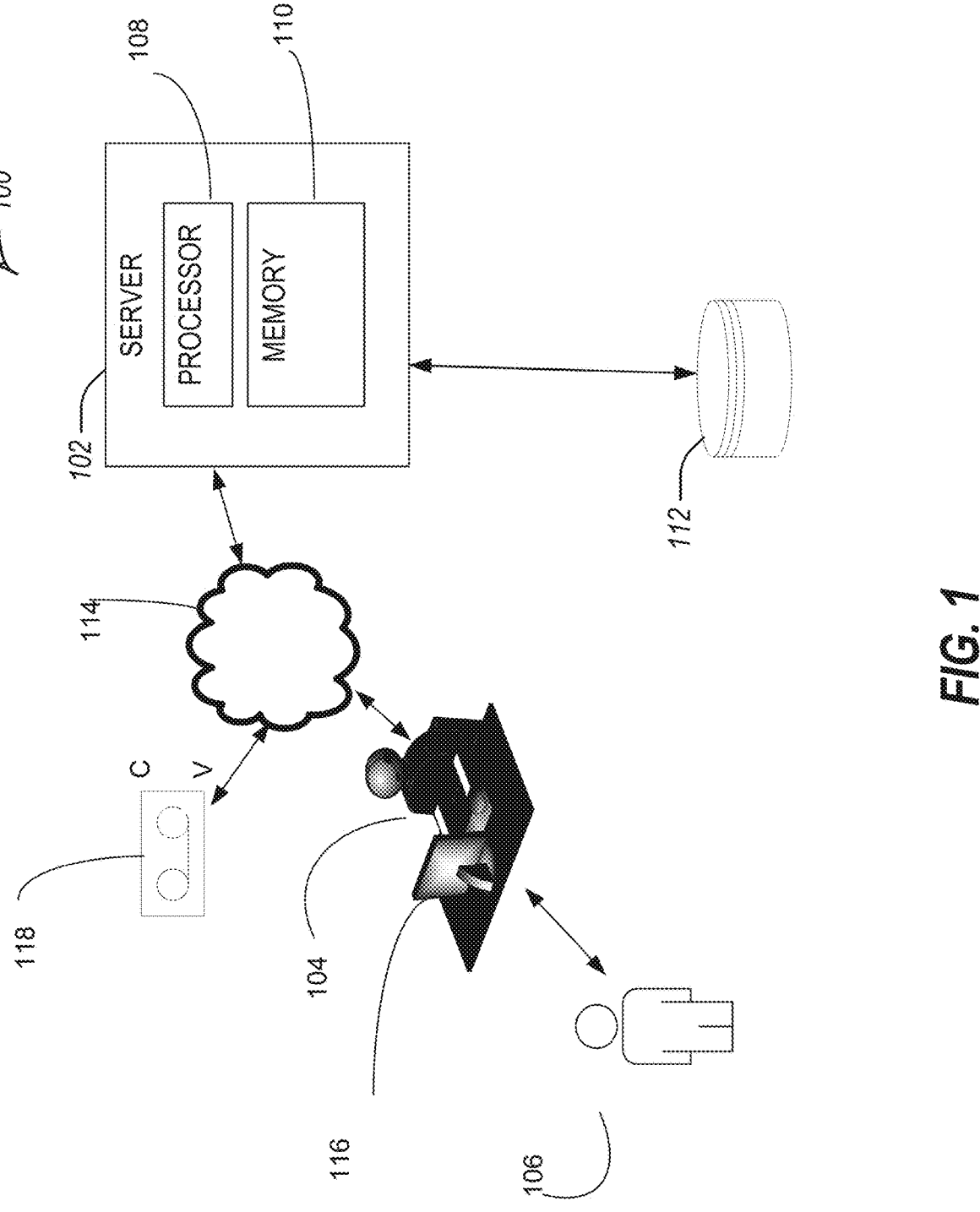
FIG. 1 illustrates a system in which example embodiments may be performed.

FIG. 1 illustrates a system 100 in which example embodiments may be implemented. The system 100 includes a server 102, which may be used to generate recommendations to an institution 104 (or agent such as a bank teller, retail clerk, etc.) for interacting with customer 106. The server 102 may include a processor 108 and memory 110 and may be in communication with or include a database 112. The server 102 may communicate, for example, via a network 114 (e.g., the Internet), with the institution 104 (or a computing device 116 provided to the institution 104 agent). The server 102 can also communicate with a device 118 configured to detect natural language. The device 118 can comprise a tape recorder, digital recorder, etc. and can be incorporated in the computing device 116 or separate from the computing device 116.

The server 102 may be operated by a retail chain (either banking or other retail) or by a home office or regional office of such a retail chain. The processor 108 can use information transmitted from, e.g., the device 118, the computing device 116 or directly as spoken by the customer 106 or institution 104 agent, to detect natural language used during at least one interaction of the customer 106 with the institution 104.

The processor 108 can determine whether a given interaction or set of interactions with customer 106 (or similarly-situated customers, e.g., customers within a protected group such as veterans) complies with a compliance standard corresponding to customer interactions with the institution 104. This determination can be based on analysis of the natural language generated during a presently-occurring interaction, or on analysis of a set of previous interactions whether with the customer 106 or similar customers.

The database 112 or the server 102 may store a model (e.g., a machine learning trained model described later herein with respect to FIG. 2); laws or regulations that might apply to a branch, region, or bank; regulatory data; or regulatory databases that link particular customers to regulations that apply to those customers, etc. The regulations can include local laws, federal laws, military laws, etc. In some examples local laws can regulate interactions in one location (e.g., bank branch, retail location) that are not regulated in another location. For example, a protected group in one location or jurisdiction may not be a protected group in another location or jurisdiction, and therefore regulations regarding interactions toward that group may not be pertinent in every branch or location of the retailer, bank, etc. The database 112 can also store any notes or texts input by the institution 104 or recordings (video or audio, etc.) of the customer 106, device 118, or computing device 116. The server 102 may retrieve the model, recordings, or other data from the database 112 to use in providing recommendations for interaction.

Figure 2:
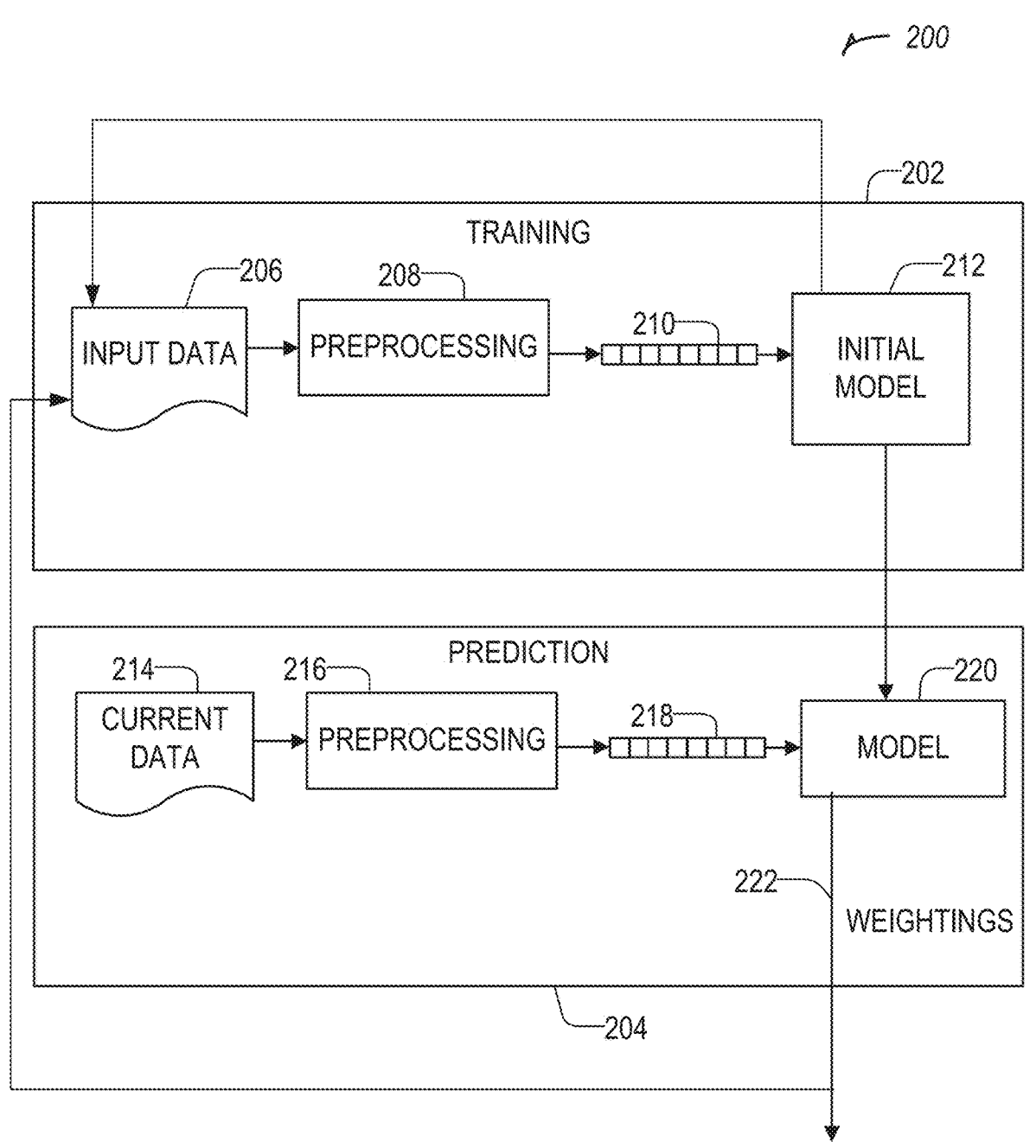
FIG. 2 illustrates machine learning engine for training and execution in accordance with some embodiments.

The device 118 or the computing device 116 can detect language used by the customer 106 or agent of the institution 104 and provide the language as an input to natural language processing (NLP) algorithms as described with respect to FIG. 2. In examples in which the interaction is online or virtual, language detection can be done based on emails or texts or telephone calls/recordings of the customer 106 or by notes entered in the computing device 116 by the agent of the institution 104. The NLP can also be adapted based on customer stress level. For example, when a branch or agent thereof does not comply with a regulation, this can cause stress to a customer, and the customer's natural language can change accordingly. This can cause differences in detection by the device 118, or by the computing device 116, or other nearby recording device.

FIG. 2 illustrates a machine learning engine 200 for training and execution in accordance with some embodiments. The machine learning engine 200 may be deployed to execute at provider server 102, for example by the processor 108 (FIG. 1). A system may perform NLP using the machine learning engine 200.

Machine learning engine 200 uses a training engine 202 and a prediction engine 204. Training engine 202 uses input data 206, for example after undergoing preprocessing component 208, to determine one or more features 210. The one or more features 210 may be used to generate an initial model 212, which may be updated iteratively or with future labeled or unlabeled data (e.g., during reinforcement learning). Comparison can be done once language is detected to determine when terms used in natural language coincides with language in a regulation or law.

The input data 206 may include natural language of the customer 106 or of an agent of the institution 104 during interaction with the customer 106. In the prediction engine 204, current data 214 may be input to preprocessing component 216. In some examples, preprocessing component 216 and preprocessing component 208 are the same. The prediction/reaction engine 204 produces feature vector 218 from the preprocessed current data, which is input into the model 220 to generate one or more criteria weightings 222. The criteria weightings 222 may be used to output a prediction, as discussed further below.

The training engine 202 may operate in an offline manner to train the model 220 (e.g., on a server). The prediction/reaction engine 204 may be designed to operate in an online manner (e.g., in real-time). In some examples, the model 220 may be periodically updated via additional training (e.g., via updated input data 206 or based on data output in the weightings 222) or based on identified future data, such as by using reinforcement learning to personalize a general model (e.g., the initial model 212) to a particular user. In some examples, the training engine 202 may use a trend analysis over time, for example with a user selected or a model identified range.

The initial model 212 may be updated using further input data 206 until a satisfactory model 220 is generated. The model 220 generation may be stopped according to a specified criteria (e.g., after sufficient input data is used, such as 1,000, 10,000, 100,000 data points, etc.) or when data converges (e.g., similar inputs produce similar outputs).

The specific machine learning algorithm used for the training engine 202 may be selected from among many different potential supervised or unsupervised machine learning algorithms, including commercial algorithms for detecting and interpreting natural language leveraging deep learning models such as transformer-based models, etc. Examples of supervised learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 202. In an example embodiment, a regression model is used and the model 220 is a vector of coefficients corresponding to a learned importance for each of the features in the vector of features 210, 218. A reinforcement learning model may use Q-Learning, a deep Q network, a Monte Carlo technique including policy evaluation and policy improvement, a State-Action-Reward-State-Action (SARSA), a Deep Deterministic Policy Gradient (DDPG), or the like.

Once trained, the model 220 may be able to determine when certain terms or words relating to financial regulations or other regulations are being used. For example, a customer 106 may not necessarily use the exact same terms for financial situations as an agent of the institution 104 might use, and the model 220 will be able to detect such a situation after training. Therefore, by detecting natural language and by detecting certain terms or words used within that language, the processor 108 can predict future actions of the customer 106 and can provide recommendations for servicing or dealing with that customer, either in real time or in subsequent interactions.

Referring again to FIG. 1, the processor 108 can generate scores, and benchmark scores for an institution (e.g., bank branch) based on a proportion of a number of interactions with the customer or a group of customers in which a compliance standard is not met. For example, by detecting certain language of the customer using the model described with respect to FIG. 2, the processor 108 can determine the customer is upset or that the customer or agent of the institution 104 are discussing aspects of a regulation or law, and a possible or likely negative interaction can be detected. The proportion of negative interactions can be calculated by dividing the number of negative interactions by the total number of interactions of the institution 104 or branch thereof.

The benchmarking can be provided branch-by-branch to detect outliers in branches. For example, an average or mean benchmark can be provided for all branches or for all branches in a region. The processor 108 can generate a training plan or a remediation plan for branches of the institution having a score lower than the benchmark score.

These scores can be stored, displayed, etc. and compared over time to measure improvements or declines in quality and to identify trends. These trends can be used to provide training to one or more agents or to an entire branch or retail location. The scores can be used to predict customers or groups of customers that have been mistreated in the past, or that are at risk of experiencing problems in a bank branch so that recommendations for handling that customer can be provided to the agent of the institution 104. For example, if a customer has been mistreated in the past, a next subsequent interaction may include remedies or special attention being paid to that customer. If the customer may be the subject of a changing regulation or other law pertinent to their business, the customer may be informed of this in a subsequent interaction. Furthermore, negative feedback can be avoided by predicting which customers may require more attention or by predicting additional ways to help a particular customer or group of customers.

Based on the determinations and scoring described above, the processor 108 can generate a recommendation for interacting with the customer 106 or other customers during subsequent interactions with the institution 104, or in real time during a current interaction, for example. For example, if one particular branch experiences many negative interactions with a particular group of customers, employees may be given training regarding the minimum regulations that must be complied with. By way of example, regulations may state that military personnel cannot be foreclosed upon during a deployment, and information regarding this regulation may be reinforced with employees of a branch if negative interactions with customers were detected regarding this regulation.

Some regulations may be enforced more regularly or more severely, or thresholds for negative interaction may be kept lower, depending on the degree of risk associated with noncompliance and on a risk tolerance level of the institution. For example, regulations leading to large fines or sanctions may be subject to a lower threshold, such that any noncompliance by an employee or branch is met with immediate or near-immediate mitigation.

By actively monitoring whether a branch or agent is complying with regulations, based on natural language detection as described above, systems and methods according to embodiments can predict which customers may require extra attention. Compliance scores and benchmarks can be generated to determine which branches or agents may require extra training or other remedial actions.

Figure 3:
FIG. 3 illustrates a flowchart showing a technique for managing customer interactions with an institution in accordance with some embodiments.
Figure 3:
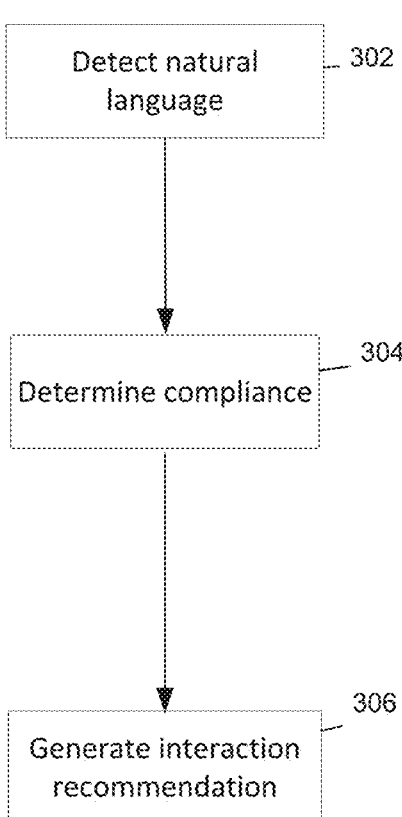

FIG. 3 illustrates a flowchart showing a method 300 for managing customer interactions with an institution 104 in accordance with some embodiments. In an example, operations of the method 300 may be performed by processing circuitry, for example processor 108 (FIG. 1). The method 300 may be performed by processing circuitry of a device (or one or more hardware or software components thereof), such as those illustrated and described with reference to FIG. 4.

The method 300 includes an operation 302 to detect natural language used during at least one interaction of a customer 106 with an institution 104. The natural language can be detected by devices (e.g., device 118 or institution 104 computing device 116) or entered as text by the institution during or immediately after an interaction with the customer 106. Voice recordings can also be captured and used for detecting natural language.

The method 300 includes an operation 304 to determine whether the interaction complies with a compliance standard corresponding to customer 106 interactions with the institution 104 based on analysis of the natural language. The compliance standard can include regulations governing financial institutions, including regulations for financial interactions with various protected groups (e.g., veterans, persons above a certain age, etc.).

The method 300 includes an operation 306 to generating, based on the determining, a recommendation for interacting with the customer or other customers during subsequent interactions with the institution.

The method 300 can include generating a benchmark score for the institution 104 based on a proportion of a number of interactions with the customer 106 or a group of customers in which the compliance standard is not met. In examples, a training plan or remediation plan can be developed for branches of the institution (or for an entire region or institution-wide) if a compliance score is lower than a benchmark or threshold. The threshold can vary depending on risk-tolerance of the institution 104.

Figure 4:
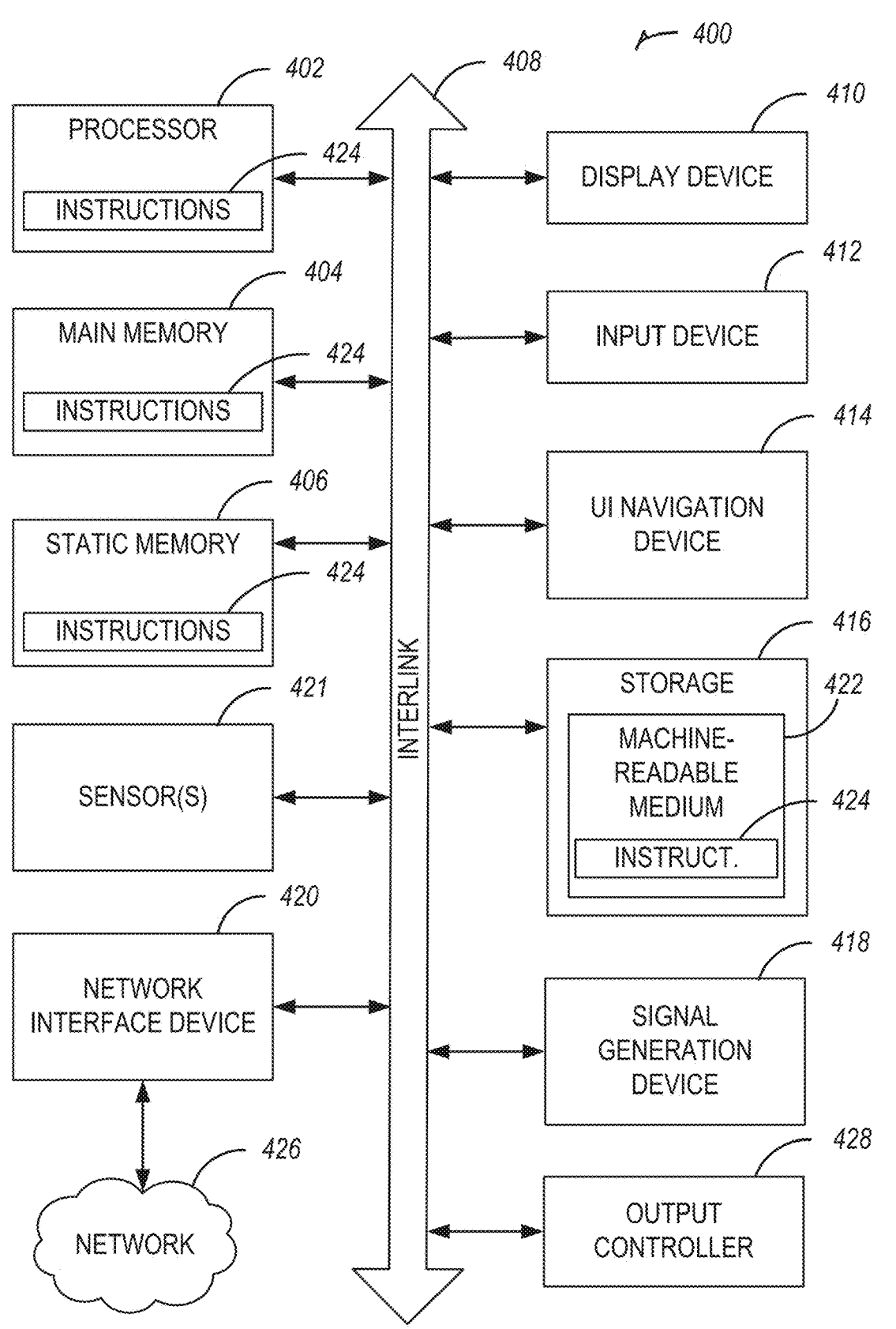
FIG. 4 illustrates generally an example of a block diagram of a machine upon which any one or more of the techniques discussed herein may perform in accordance with some embodiments.

FIG. 4 illustrates generally an example of a block diagram of a machine 400 upon which any one or more of the techniques (e.g., methodologies) discussed herein may perform in accordance with some embodiments. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the execution units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, alphanumeric input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 that is non-transitory on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), a legacy telephone network, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

The following, non-limiting examples, detail certain aspects of the present subject matter to solve the challenges and provide the benefits discussed herein, among others.

Example 1 is a method comprising: detecting natural language used during at least one interaction of a customer with an agent of an institution; determining whether the at least one interaction complies with a compliance standard corresponding to customer interactions with the institution based on analysis of the natural language; and generating, based on the determining, a recommendation for interacting with the customer during interactions with the agent of the institution.

In Example 2, the subject matter of Example 1 can optionally include generating a benchmark score for the institution based on a proportion of a number of interactions with the customer or a group of customers in which the compliance standard is not met.

In Example 3, the subject matter of Example 2 can optionally include generating at least one of a training plan or a remediation plan for a branch of the institution having a score lower than the benchmark score.

In Example 4, the subject matter of Example 2 can optionally include wherein a threshold for determining whether the compliance standard is met is based on a risk tolerance level of the institution.

In Example 5, the subject matter of Example 2 can optionally include wherein the compliance standard includes a regulation that governs financial interactions.

In Example 6, the subject matter of Example 5 can optionally include wherein the regulation regulates financial interactions with a protected group.

In Example 7, the subject matter of any of Examples 1-6 can optionally include wherein natural language is input as text by the agent of the institution.

In Example 8, the subject matter of any of Examples 1-7 can optionally include wherein natural language is input as a voice recording of the customer, of the interaction, or of the agent of the institution.

In Example 9, the subject matter of any of Examples 1-8 can optionally include wherein natural language is input as a text communication or a voice communication by at least one customer.

In Example 10, the subject matter of any of Examples 1-9 can optionally include wherein detecting the natural language includes implementing a natural language processing (NLP) algorithm.

In Example 11, the subject matter of any of Examples 1-10 can optionally include wherein the recommendation includes a recommendation to mitigate an adverse event associated with the customer.

Example 12 is a system including means for performing any of Examples 1-11.

Example 13 is a non-transitory computer-readable medium including instructions that, when executed on a processor, cause the processor to perform operations including any of Examples 1-11.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
   receiving, using processing circuitry, interaction data of at least one interaction of a customer with an agent of an institution;
   preprocessing, using the processing circuitry, the received interaction data;
   generating, using the processing circuitry, a multidimensional numerical feature vector from the preprocessed interaction data, the multidimensional numerical feature vector being input to a machine learning model trained with historical data of a plurality of interactions between customers and agents of the institution;

using the processing circuitry, determining, using the machine learning model, that a regulated topic is represented in the at least one interaction based on the generated multidimensional numerical feature vector, the determining including the machine learning model mapping the multidimensional numerical feature vector to a regulated-topic representation;

in response to determining that the regulated topic is represented in the at least one interaction, generating, using the processing circuitry, a banker compliance score for the agent based on the at least one interaction and the regulated topic;

determining, using the processing circuitry, whether the banker compliance score satisfies a compliance standard specific to a branch location of the agent; and in response to determining that the banker compliance score fails to satisfy the compliance standard specific to the branch location of the agent, automatically outputting, to an agent computing device, using the processing circuitry, a recommendation identifying a remediation for the branch location for future customer interactions.

2. The method of claim 1, further comprising:

generating a benchmark score for the institution based on a proportion of a number of interactions with the customer or a group of customers in which the compliance standard is not met.

3. The method of claim 2, further comprising generating at least one of a training plan or a remediation plan for a branch of the institution having a score lower than the benchmark score.

4. The method of claim 2, wherein a threshold for determining whether the compliance standard is met is based on a risk tolerance level of the institution.

5. The method of claim 2, wherein the compliance standard includes a regulation that governs financial interactions.

6. The method of claim 5, wherein the regulation regulates the financial interactions with a protected group.

7. The method of claim 1, wherein natural language is input as text by the agent of the institution.

8. The method of claim 1, wherein the interaction data includes at least one of a voice recording of the customer, of an interaction of the customer with the agent, or of the agent of the institution.

9. The method of claim 1, wherein the interaction data includes at least one of a text communication or a voice communication by at least one customer.

10. The method of claim 1, wherein determining that the regulated topic is represented in the at least one interaction includes implementing a natural language processing (NLP) algorithm.

11. The method of claim 1, wherein the recommendation includes a mitigation recommendation to mitigate an adverse event associated with the customer.

12. A system for managing customer interactions with an institution, the system comprising:

a device configured to receive interaction data of at least one interaction of a customer with an agent of the institution; and a processor configured to:

preprocess the received interaction data;

generate a multidimensional numerical feature vector from the preprocessed interaction data, the multidimensional numerical feature vector being input to a machine learning model trained with historical data of a plurality of interactions between customers and agents of the institution;

determine, using the machine learning model, that a regulated topic is represented in the at least one interaction based on the generated multidimensional numerical feature vector, the determining including the machine learning model mapping the multidimensional numerical feature vector to a regulated-topic representation;

in response to determination that the regulated topic is represented in the at least one interaction, generate a banker compliance score for the agent based on the at least one interaction and the regulated topic;

determine whether the banker compliance score satisfies a compliance standard specific to a branch location of the agent; and in response to determining that the banker compliance score fails to satisfy with the compliance standard specific to the branch location of the agent, automatically output, to an agent computing device, a recommendation identifying a remediation for the branch location for future customer interactions.

13. The system of claim 12, wherein the processor is further configured to:

generate a benchmark score for the institution based on a proportion of a number of interactions with the customer or a group of customers in which the compliance standard is not met.

14. The system of claim 13, wherein the processor is further configured to generate at least one of a training plan or a remediation plan for branches of the institution having a score lower than the benchmark score.

15. The system of claim 13, wherein the compliance standard includes a regulation that governs financial interactions, and wherein the regulation regulates the financial interactions with a protected group.

16. The system of claim 12, wherein the interaction data includes at least one of a voice recording of the customer, of an interaction of the customer with the agent, or of the agent of the institution, and wherein determine that the regulated topic is represented in the at least one interaction includes implementing a natural language processing (NLP) algorithm.

17. A non-transitory computer-readable medium including instructions that, when executed on a processor, cause the processor to perform operations including:

receiving interaction data of at least one interaction of a customer with an agent of an institution;

preprocessing the received interaction data;

generating a multidimensional numerical feature vector from the preprocessed interaction data, the multidimensional numerical feature vector being input to a machine learning model trained with historical data of a plurality of interactions between customers and agents of the institution;

determining, using the machine learning model, that a regulated topic is represented in the at least one interaction based on the generated multidimensional numerical feature vector, the determining including the machine learning model mapping the multidimensional numerical feature vector to a regulated-topic representation;

in response to determining that the regulated topic is represented in the at least one interaction, generating a banker compliance score for the agent based on the at least one interaction and the regulated topic;

determining whether the banker compliance score satisfies a compliance standard specific to a branch location of the agent; and in response to determining that the banker compliance score fails to satisfy the compliance standard specific to the branch location of the agent, automatically outputting, to an agent computing device, a recommendation identifying a remediation for the branch location for future customer interactions.

18. The non-transitory computer-readable medium of claim 17, wherein the operations further include:

generating a benchmark score for the institution based on a proportion of a number of interactions with the customer or a group of customers in which the compliance standard is not met; and generating at least one of a training plan or a remediation plan for branches of the institution having a score lower than the benchmark score, wherein a threshold for determining whether the compliance standard is met is based on a risk tolerance level of the institution.

19. The non-transitory computer-readable medium of claim 17, wherein the compliance standard includes a regulation that governs financial interactions, and wherein the regulation regulates the financial interactions with a protected group.

20. The non-transitory computer-readable medium of claim 17, wherein determining that the regulated topic is represented in the at least one interaction includes implementing a natural language processing (NLP) algorithm.

\* \* \* \* \*